July 21, 1970           D. H. CHESTER           3,521,519

PIVOTABLE MEANS

Filed Oct. 26, 1967           2 Sheets-Sheet 1

INVENTOR.
DWIGHT H. CHESTER
BY
Wolf, Greenfield & Hieken
ATTORNEYS

July 21, 1970  D. H. CHESTER  3,521,519
PIVOTABLE MEANS
Filed Oct. 26, 1967  2 Sheets-Sheet 2
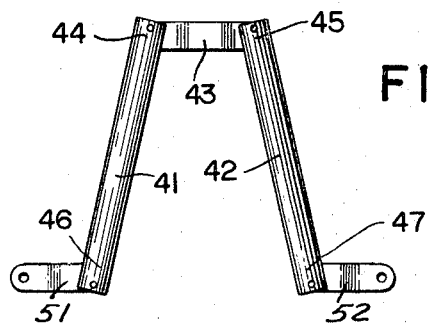
FIG. 8
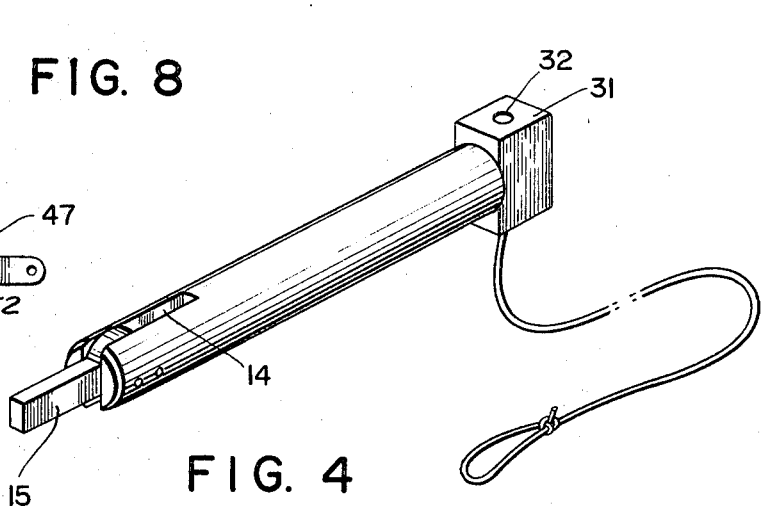
FIG. 4
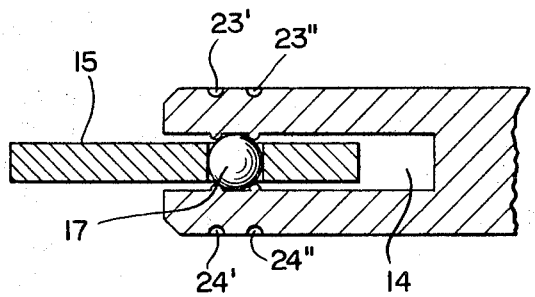
FIG. 5
FIG. 6
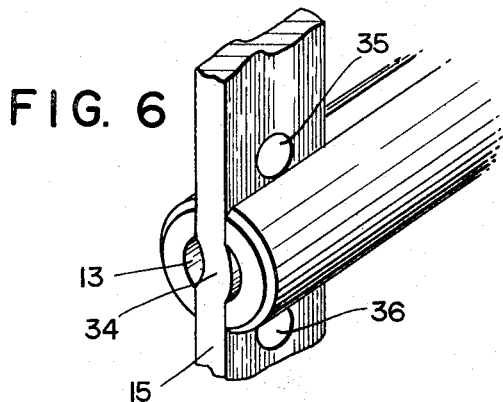
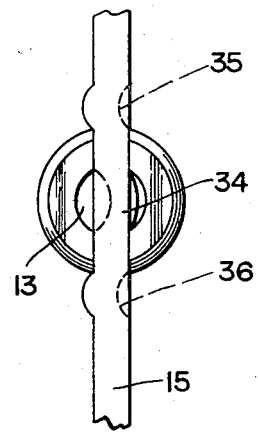
FIG. 7
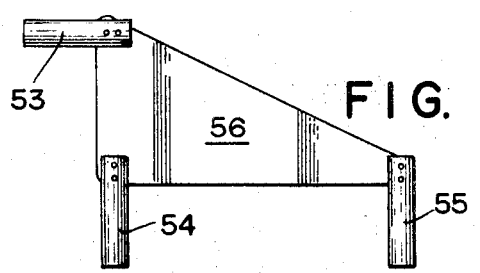
FIG. 9
INVENTOR.
DWIGHT H. CHESTER
BY
Wolf, Greenfield & Hieken
ATTORNEYS

United States Patent Office 3,521,519
Patented July 21, 1970

3,521,519
PIVOTABLE MEANS
Dwight H. Chester, 151 Grant Central Ave.,
Amityville, N.Y. 11701
Filed Oct. 26, 1967, Ser. No. 678,299
Int. Cl. F16b 21/00
U.S. Cl. 85—3                                                         3 Claims

ABSTRACT OF THE DISCLOSURE

A pin has a bifurcated end formed with opposed recesses across the gap in the bifurcated end for accommodating a ball. A flat blade is formed with an opening for accommodating the ball so that the flat blade may pivot about the ball when the ball is seated in the opposed recesses between typically an unlocked position, coextensive with the pin axis, to typically a locked position, at right angles to the pin axis.

BACKGROUND OF THE INVENTION

The present invention relates in general to pivotable means and more particularly concerns a novel locking pin, derivatives thereof and methods of manufacture, which pin is relatively easy and inexpensive to make, yet is characterized by a degree of reliability sufficient for use in aircraft. A feature of the invention resides in the ease with which it may be inserted and withdrawn while providing reliable locking action after many insertions and withdrawals.

One of the more common locking pins is the familiar cotter pin comprising a generally U-shaped piece of wire with an enlarged bight of diameter slightly greater than the diameter of a hole for receiving the pin. A cotter pin typically is inserted through such a hole in the end of an axle, and the legs spread apart to prevent a wheel on the axle from sliding off the axle. While such a pin functions well for many purposes, it has a number of disadvantages. Normally such a pin may be safely used only once. Tools and usually some strength are required to insert and remove the pin.

It is an important object of this invention to provide a pivotable means suitable for use in connection with locking, hinging and other functions of pivotable means.

It is another important object of this invention to provide a reliable locking pin that may be easily inserted and withdrawn without tools and yet retains the locked position securely until such time as the unlocked position is consciously desired.

It is another object of the invention to achieve the preceding object with a locking pin that is relatively easy and inexpensive to fabricate.

It is another object of the invention to provide methods for making one or more of the structures mentioned above.

Numerous other features, objects and advantages of the invention will become apparent from the following specification when read in connection with the accompanying drawing in which:

BRIEF DESCRIPTION OF THE DRAWING

FIG. 4 is a perspective view of a preferred form of locking pin head that is flat with a plastic attaching cable secured there;

FIG. 5 is a longitudinal sectional view of the bifurcated end illustrating the preferred means of securing the ball by staking at four points;
FIG. 6 is a perspective view illustrating a modification of the blade for insuring more positive locking action;
FIG. 7 is an end view of the modification of FIG. 6 helpful in illustrating relationship among the different elements when the blade is in the locked position;
FIG. 8 is a perspective view of rods pivotably linked by a blade to form a hinge element according to the invention; and
FIG. 9 is a perspective view of three rods pivotably linked by a triangular plate to illustrate an example of a linkage according to the invention.

DETAILED DESCRIPTION OF PREFERRED EMBODIMENTS

Figure 1:
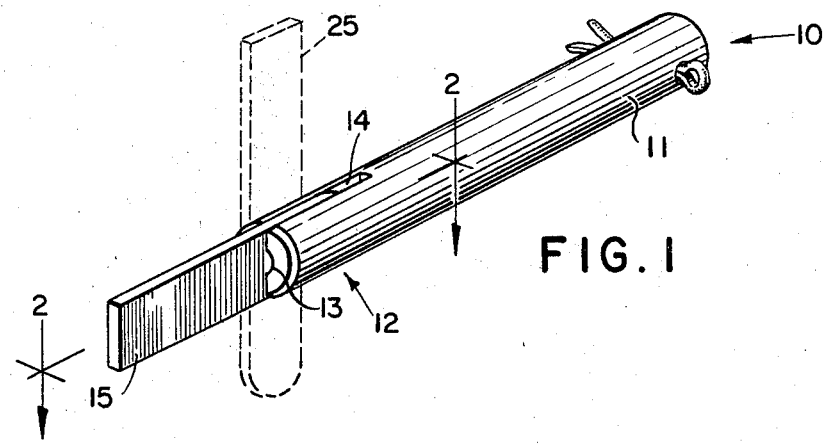
FIG. 1 is a perspective view of a preferred embodiment of the invention.
Figure 2:
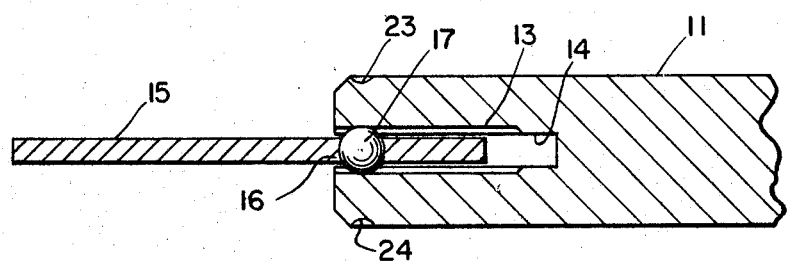
FIG. 2 is a sectional view through section 2—2 of FIG. 1.
Figure 3:
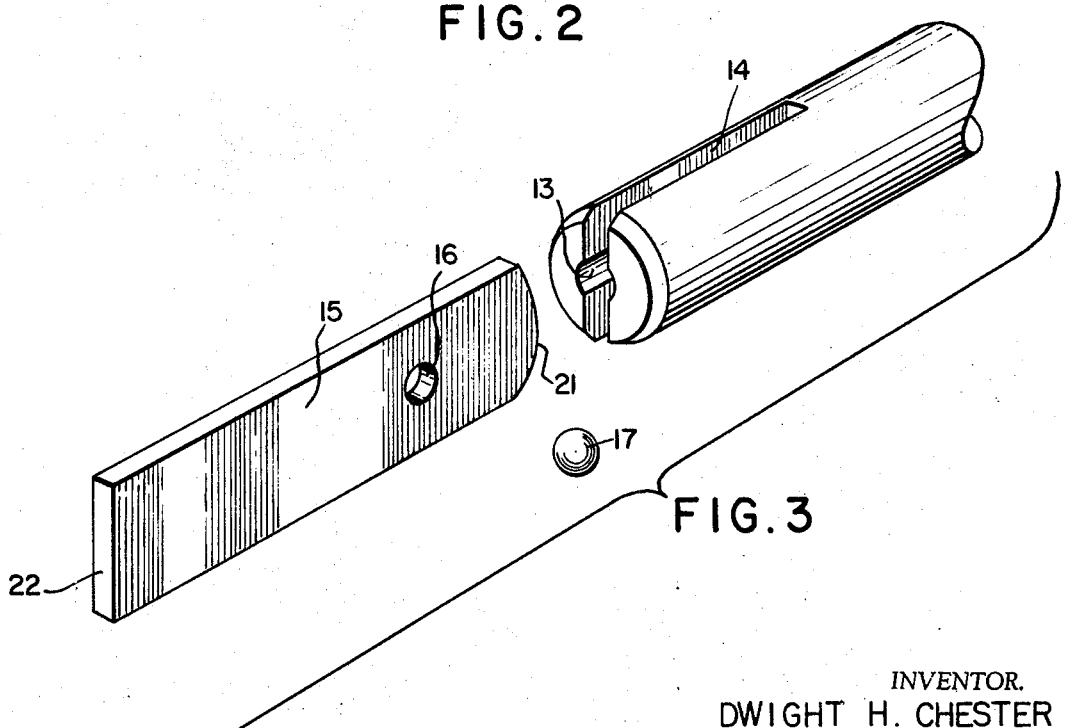
FIG. 3 is an exploded view of the elements of the invention helpful in understanding its structure.

With reference now to the drawing and more particularly FIG. 1 thereof, there is shown a perspective view of a preferred embodiment of the invention. Reference also to FIGS. 2 and 3 may be helpful in understanding the invention. The locking pin includes a cylindrical rod 11, which may be ¼-inch diameter stainless steel 1⅝ inches long, it being understood that other materials and dimensions may be used within the principles of the invention. The end 12 may be bifurcated, preferably in the following manner. First, a hole 13 is drilled, typically ¾ inch deep. Then a diametrical slot, typically 0.062 inch thick and ½ inch long is cut in the end 12. Hole 13 is typically .124 inch in diameter within a mil tolerance.

Blade 15 may be stamped and have the shape best seen in FIG. 3 of stainless steel formed with an opening 16 of .124 inch for snugly accommodating a stainless steel ball 17 of diameter .125 inch. The width of blade 15 is typically .245 inch, and its thickness is typically .050 inch. Its length is typically ⅞ inch, and the center of opening 16 is typically located ³⁄₁₆ inch from end 21 and ¹¹⁄₁₆ inch from end 22 so that the distance from the center of opening 16 to end 21 is less than the length of slot 14 while the distance between the center of opening 16 and end 22 is greater than the distance between the center of opening 16 and the inside edge of slot 14. Thus, blade 15 preferably does not pivot through 360°.

There may be certain applications where it is desired that blade 15 be free to rotate through 360°. This result may be readily achieved by making the distance between the center of opening 16 and either end of blade 15 less than the distance between the center of opening 16 and the inside edge of slot 14.

Ball 17 is first force-fitted into opening 16. Blade 15 is then forced into opening 13 until ball 17 is seated, as best shown in FIG. 2. Then ball 17 is staked by applying pressure at 23, 24 for example so that ball 17 remains fixed relative to the bifurcated end 12 of rod 11. Blade 15 is then free to pivot about ball 17 in the plane of slot 14 to the position generally indicated by the dotted outline 25 in FIG. 1 to a secure locked position. The head end may accommodate a cotter pin, such as 16, or the head end may be formed enlarged in the same manner as a screw head is formed.

In use the locking pin according to the invention is inserted with blade 15 longitudinally aligned with rod 11 as shown. Blade 15 is then rotated through 90° to the locking position designated by dotted outline 25. In the locked position the pin may function to keep elements together as a cotter pin or any other locking pin does. Thus, the invention may hold a cable assembly together, typically of the type in which the ends of the cables to be connected terminate in mating connectors formed with overlapping eyes that may be pinned together by the locking pin.

Certain typical dimensions and materials have been set forth above. Certain preferred dimensions include the hole drilled in the end of rod 11 and the opening 16 in blade 15 being slightly less than the diameter of ball 17 to assure a reasonably secure press fit of ball 17. The diameter of opening 16 is not so small that blade 15 may not be pivoted about ball 17 after ball 17 is staked in position.

Preliminary tests of an exemplary embodiment have shown no discernible change in effectiveness after 1000 cycles of operation of blade 15 from the inline position to the perpendicular position and back again.

Referring to FIG. 4, there is shown a perspective view of a preferred form of head end that may be preferred in a number of applications in which the cotter pin is replaced by an end that is essentially the cap of a T and of the shape of a rectangular solid as shown. This preferred head 31 typically may be 3/8" long, 1/4" wide and 1/8" thick and formed with an opening 32 accommodating a plastic cable for attaching the locking pin according to the invention to the machine or system with which it is used to prevent loss of the pin. A feature of this head is that it may be readily gripped by ordinary gas pliers without interference from the plastic cable and removed when desired. Sometimes when an ordinary clevis pin or the like is used near salt water or in another corrosive atmosphere, corrosion presents serious difficulties in removing the clevis pin from the structure held together thereby. The flat head according to the invention facilitates removal.

Referring to FIG. 5 there is shown a slight modification of the slotted end shown in FIG. 2 illustrating a preferred arrangement of staking. Staking occurs at four places 23', 23", 24' and 24" so that the ball 17 is secured between four stake points, thereby effectively increasing the area of contact with the ball 17; and hence, the total frictional force locking the ball in place while reducing the stress inside the ball.

Referring to FIG. 6, there is shown a modification of the end of blade 15 in which the central portion of blade 15 is shown formed with a protrusion 34 forming a ridge on one side of blade 15 and depressions 35 and 36 forming bumps on the other side that coact to provide a locking feature as best seen in the end sectional view of FIG. 7. The protrusion or ridge 34 resides in bore 13 when blade 15 is in the locked position with bumps 35 and 36 closely engaging the outside surface of the pin adjacent to slot 14 as best seen in FIG. 7.

The invention has a number of uses. The locking assembly may be situated in both or one end of a control rod. The invention may function as a marine-type pin. Both ends of a pin may have the locking mechanism according to the invention. Both ends of an axle may have the locking mechanism according to the invention.

Referring to FIG. 8 there is shown a perspective view of an adaptation of the invention functioning as a hinge element. This hinge element comprises two of the rod-like elements 41 and 42, respectively, similar to the construction described above in connection with a blade carrying a ball nearer to the middle. The other ends 46 and 47 of rods 41 and 42, respectively, may also be bifurcated and carry blades 51 and 52, respectively, pivotably secured by means including the ball seating arrangement described above.

Referring to FIG 9, there is shown still another variation of the invention in which rod-like elements 53, 54 and 55 are pivotably connected to the corners of a triangular plate 56 to form a linkage. Each corner of triangular plate 56 carries a ball seated in the manner described above in connection with a blade carrying a ball. It is to be understood that those skilled in the art will now be able to construct virtually an unlimited number of linkages incorporating one or more of the pivotable means according to the invention without departing from the invention.

It is evident that those skilled in the art may now make numerous uses and modifications of and departures from the specific embodiments and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:
1. Pivotable means comprising,
means defining a rod-like portion formed with a bifurcated end,
blade means formed with an opening accommodating ball means force-fitted therein,
said ball means being supported in fixed relationship to and between the opposed portions of said bifurcated end so that said blade means is pivotable about said ball means,
said ball means residing in a partially generally circular channel in said bifurcated end of diameter prior to insertion of said ball means slightly less than the diameter of said ball means,
said ball means being staked between opposed legs of said bifurcated end to remain stationary with the inside of said channel pressing against said ball to keep said ball and said channel in fixed relative relationship while permitting rotation of said plate means about said ball means.

2. A pivotable means in accordance with claim 1 wherein said blade means includes an opening accommodating said ball means which opening prior to insertion of said ball means was slightly less than the diameter of said ball means.

3. Pivotable means in accordance with claim 1 and further comprising,
means defining a head end of said rod-like portion of span greater than the diameter of said rod-like portion,
said ball means being supported in fixed relationship to and between the opposed portions of said bifurcated end so that said blade means is pivotable about said ball means between an unlocked position coextensive with said rod-like portion to a locking position substantially orthogonal to said rod-like portion to form a locking pin which in the unlocked position may be inserted through a locking pin opening slightly greater in diameter than that of said rod-like portion but slightly less than the head end span and then said locking position established so that said head end and said blade means coact to prevent said locking pin from being removed from said locking pin opening until said unlocked position is reestablished.

References Cited

UNITED STATES PATENTS

| 1,077,006 | 10/1913 | Smith | 85—3 |
| 1,516,347 | 11/1924 | Pataky | 85—3 |
| 2,124,658 | 7/1938 | Smith | 85—3 |
| 2,352,347 | 6/1944 | Scrantom | 287—100 |

EDWARD C. ALLEN, Primary Examiner

U.S. Cl. X.R.

29—442; 74—519